United States Patent
Mountrakis

(10) Patent No.: US 7,577,626 B1
(45) Date of Patent: Aug. 18, 2009

(54) MULTI-SCALE RADIAL BASIS FUNCTION NEURAL NETWORK

(76) Inventor: Georgios Mountrakis, 1101 Cumberland Ave., Syracuse, NY (US) 13210

(*) Notice: Subject to any disclaimer, the term of this patent is extended or adjusted under 35 U.S.C. 154(b) by 389 days.

(21) Appl. No.: 11/441,954

(22) Filed: May 26, 2006

(51) Int. Cl.
*G06N 3/04* (2006.01)

(52) U.S. Cl. .......................... 706/26; 706/16

(58) Field of Classification Search ............... None
See application file for complete search history.

(56) References Cited

U.S. PATENT DOCUMENTS

| | | | |
|---|---|---|---|
| 5,640,103 A * | 6/1997 | Petsche et al. ............... | 324/772 |
| 5,717,832 A | 2/1998 | Steimle et al. | |
| 5,740,326 A | 4/1998 | Boulet et al. | |
| 6,216,119 B1 | 4/2001 | Jannarone | |
| 6,351,711 B1 | 2/2002 | Chansarkar | |
| 6,453,206 B1 | 9/2002 | Soraghan et al. | |
| 6,516,309 B1 | 2/2003 | Eberhart et al. | |
| 6,539,304 B1 | 3/2003 | Chansarkar | |
| 6,647,377 B2 | 11/2003 | Jannarone | |
| 6,650,779 B2 * | 11/2003 | Vachtesvanos et al. ...... | 382/228 |
| 6,725,208 B1 | 4/2004 | Hartman et al. | |
| 6,922,680 B2 * | 7/2005 | Buczak ......................... | 706/15 |

OTHER PUBLICATIONS

Mark J. L. Orr, "Introduction to Radial Basis Function Networks", Centre for Cognitive Science, University of Edinburgh, 1996, pp. 1-67.*
Han et al. "Efficient Clustering of Radial Basis Perceptron Neural Network for Pattern Recognition", 2003, pp. 2059-2067.*
Han et al. "Radial Basis Perceptron Network and its Applications fro Pattern Recognition", 2002, pp. 669-674.*

* cited by examiner

*Primary Examiner*—David R Vincent
*Assistant Examiner*—Omar F Fernandez Rivas
(74) *Attorney, Agent, or Firm*—MacMillan, Sobanski & Todd, LLC

(57) ABSTRACT

A network architecture of radial basis function neural network system utilizes a blocking layer (4) to exclude successfully mapped neighborhoods from later node influence. A signal is inserted into the system at input nodes (I1, I2, ... In), which then promulgates to a non-linear layer (2). The non-linear layer (2) comprises a number of non-linear activation function nodes (10). After passing through the non-linear layer (2), the signal passes through the blocking layer (4) that is comprised of either binary signal blocking nodes, or inverted symmetrical Sigmoidal signal blocking nodes (12) that act in a binary fashion. Finally, the signal is weighted by a weighting function (6a, 6b, 6c, 6n), summed at a summer (8) and outputted at (O).

24 Claims, 14 Drawing Sheets

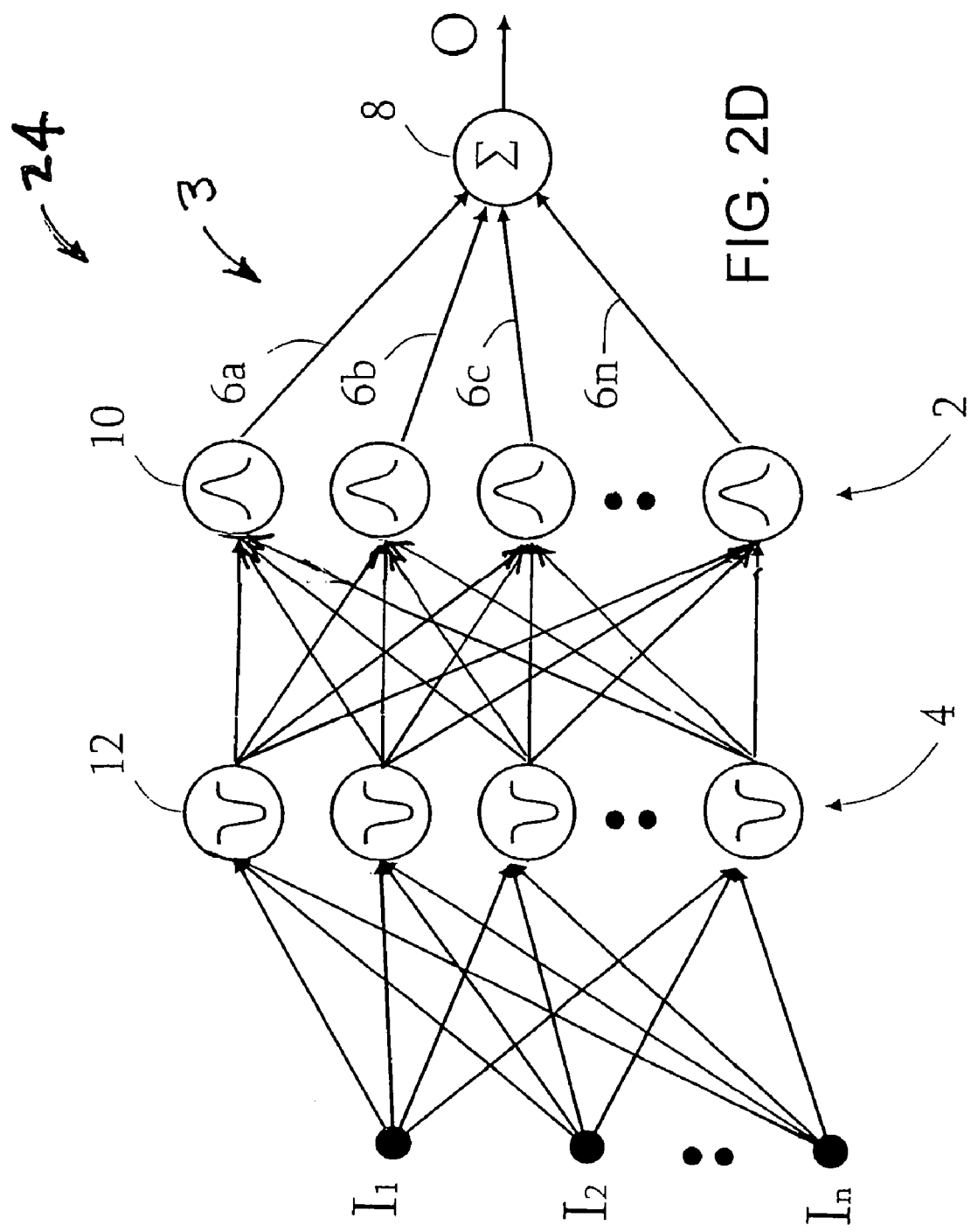

Original training dataset

Dataset after first iteration

MULTI-SCALE RADIAL BASIS FUNCTION NEURAL NETWORK

BACKGROUND OF THE INVENTION

1. Field of the Invention

The present invention relates in general to a radial basis function neural network and in particular to such a neural network incorporating filtering to assure that successfully mapped neighborhoods are excluded from later node influence.

2. Description of the Prior Art

Referring to the drawings, there is shown in FIG. 1, a typical prior art Radial Basis Function (RBF) neural network 1. The RBF neural network 1 is a combination of an input layer consisting of the nodes labeled 10 a single hidden layer 2 with the radial basis functions and a linear output layer 3. The linear output layer 3 consist of a plurality of weighting functions that are labeled 6a, 6b, 6c . . . 6n while the hidden layer 2 consists of a number of non-linear activation nodes 10. The non-linear activation functions of the hidden layer nodes 10 are based on the Euclidean distance between an input vector and a weight vector. The responses of the linear output layer 4 are added at a summing point 8 to form an output signal O.

A variety of patents disclose improvements to neural networks. For example, U.S. Pat. No. 5,717,832 to Steimle and U.S. Pat. No. 5,740,326 to Boulet et al. are related and disclose a form of blocking to simplify neural networks. U.S. Pat. Nos. 6,216,119 and 6,647,377 to Jannarone, based on the same disclosure, disclose a neural network having the capability to learn and predict in real time. U.S. Pat. Nos. 6,351,711 and 6,539,304 to Chansarkar, also based on the same disclosure, disclose a GPS receiver incorporating a neural network. U.S. Pat. No. 6,453,206 to Soraghan, et al. discloses a radial basis function network having a function generator incorporating trigonometric terms. U.S. Pat. No. 6,516,309 to Eberhart, et al. discloses a neural network which removes processing elements from the definition of the neural network in response to corresponding activation parameters satisfying certain criteria. U.S. Pat. No. 6,725,208 to Hartman, et al. discloses a Bayesian neural network incorporating a form of blocking.

As shown by the above examples, the prior art relating to neural networks is highly developed. However, a need remains for further improvement in order to prevent neighborhoods successfully mapped with a neural network from later node influence.

SUMMARY OF THE INVENTION

Accordingly, it is a principal object of this invention to provide a neural network architecture in which successfully mapped neighborhoods are excluded from later node influence.

It is another object of the invention to provide such a neural network architecture incorporating an improved technique for identifying successfully mapped neighborhoods.

It is a further object of the invention to provide novel training method for such a neural network where local statistics, i.e., errors within the receptive field of an activation function, are incorporated in activation function selection.

The attainment of these and related objects may be achieved through use of the novel multi-scale radial basis function neural network, a device for manipulating data that utilizes a radial basis function neural network, and an algorithm for carrying out radial basis function neural network signal processing as herein disclosed.

A multi-scale radial basis function neural network in accordance with this invention has at least one signal input and a signal output. A non-linear activation layer comprising a plurality of activation functions is coupled between the signal input and the signal output. A blocking layer comprising a plurality of selectively active blocking functions is coupled between the signal input and the signal output. A summer is coupled to supply output signals to the signal output.

In a preferred form of the multi-scale radial basis function neural network, the non-linear activation layer is coupled to at least one signal input node. The blocking layer has the selectively active blocking functions connected to corresponding activation functions in the activation layer, to receive signals therefrom. The summer is coupled to the blocking layer to receive signals therefrom. The summer then supplies the summed signals to a signal output node. Alternately, the blocking layer may be connected to the at least one signal input node and the activation layer connected between the blocking layer and the summer. Additionally, the individual signals may be weighted before being summed.

The device for manipulating data in accordance with the invention includes a data processing device connected to a memory storage device, the memory storage device having stored therein a computer program for providing a radial basis function neural network. The computer program comprises a first program code segment which defines a signal input. A second program code segment defines a signal output. A third program code segment defines a non-linear activation layer comprising a plurality of activation functions coupled between the signal input and the signal output. A fourth program code segment defines a blocking layer comprising a plurality of selectively active blocking functions coupled between the signal input and the signal output. A fifth program code segment defines a summer to supply signals to the signal output.

In a preferred form of the device for manipulating data, the third program code segment defines the plurality of activation functions to receive signals from the signal input. The fourth program code segment defines the plurality of selectively active blocking functions as connected to corresponding activation functions of the activation layer to receive signals from the non-linear activation layer. The fifth program code segment defines the summer to receive signals from the blocking layer. The second program code segment defines a signal output to receive signals from the summer.

The algorithm for carrying out radial basis function neural network signal processing in accordance with the invention includes supplying input signals to be processed. Non-linear signal processing of the input signals is then carried out to provide non-linear signal processed signals. The non-linear signal processed signals are mapped. The non-linear signal processed signals are selectively blocked to exclude successfully mapped ones of the non-linear signal processed signals and to provide non-blocking signals. The output signals from the blocking layer are summed to give a summed signal. The summed signal is then outputted.

The attainment of the foregoing and related objects, advantages and features of the invention should be more readily

BRIEF DESCRIPTION OF THE DRAWINGS

FIG. 2D shows an alternate embodiment of the MSRBF neural network architecture shown in FIG. 2B.

DETAILED DESCRIPTION OF THE PREFERRED EMBODIMENT

The present invention contemplates a multi-scale approach for Radial Basis Function (RBF) neural network modeling technique that chooses two Gaussian distributions having variable spreads over other candidates by examining local behavior in addition to global Mean Square Error (MSE). By global MSE is meant traditional MSE, the one that results by using all the points in a dataset to calculate the MSE, while local behavior concerns how well a chosen activation function fits the dataset points that are within the activation function's receptive field. The multi-scale approach of the present invention is significantly more powerful than prior art methods since the method of the present invention has the ability to model a signal at multiple resolutions without the drawbacks of a pre-defined single spread, to include overlapping data fields. In prior art multi-scale RBF neural networks a multi-scale capability might exist but is hindered when there is an overlap of receptive fields. Such existing multi-scale RFB neural networks can still capture the signal in multiple resolutions, but they lack a fundamental functionality, namely the capability to distinguish and isolate signals of different resolution in overlapping receptive fields. The present invention contemplates an enhanced multi-scale RFB neural network that does provide the capability to distinguish and isolate signals of different resolution in overlapping receptive fields.

Figure 9A:
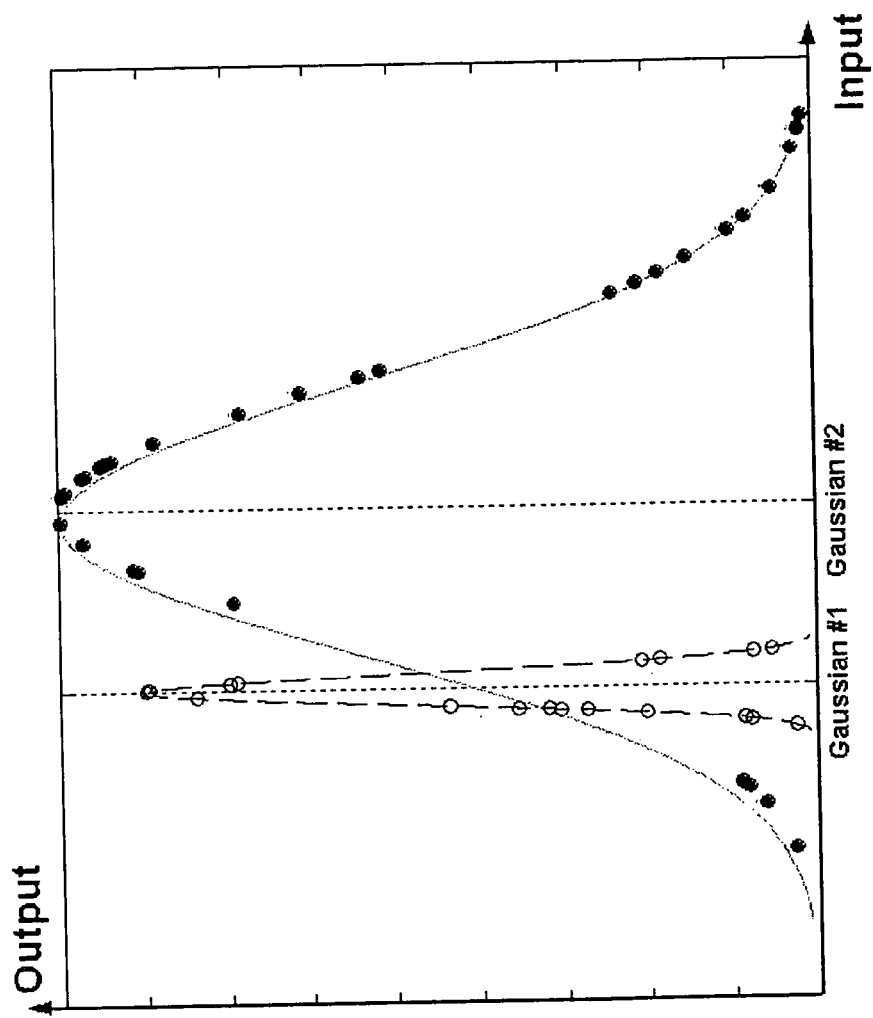
FIG. 9A illustrates a training data set for a neural network created from two different Gaussian distributions.

To better understand the significance of the above, consider a RBF neural network training case illustrated in FIG. 9A. All points in the figure belong to the same dataset; however, the data points belong to two Gaussian distributions having different spreads. In order to visually distinguish between the Gaussian distributions, the data points shown by open circles belong to a smaller spread Gaussian No. 1 distribution while the data points shown by solid circles belong to a Gaussian No. 2 distribution having a large spread. If the two Gaussians did not overlap, then existing approaches would be able to model them appropriately. But in this case the receptive fields of the two Gaussian distributions overlie each other with the data points of the Gaussian No. 1 distribution falling within the range of the data points of the Gaussian No. 2 distribution.

Figure 9B:
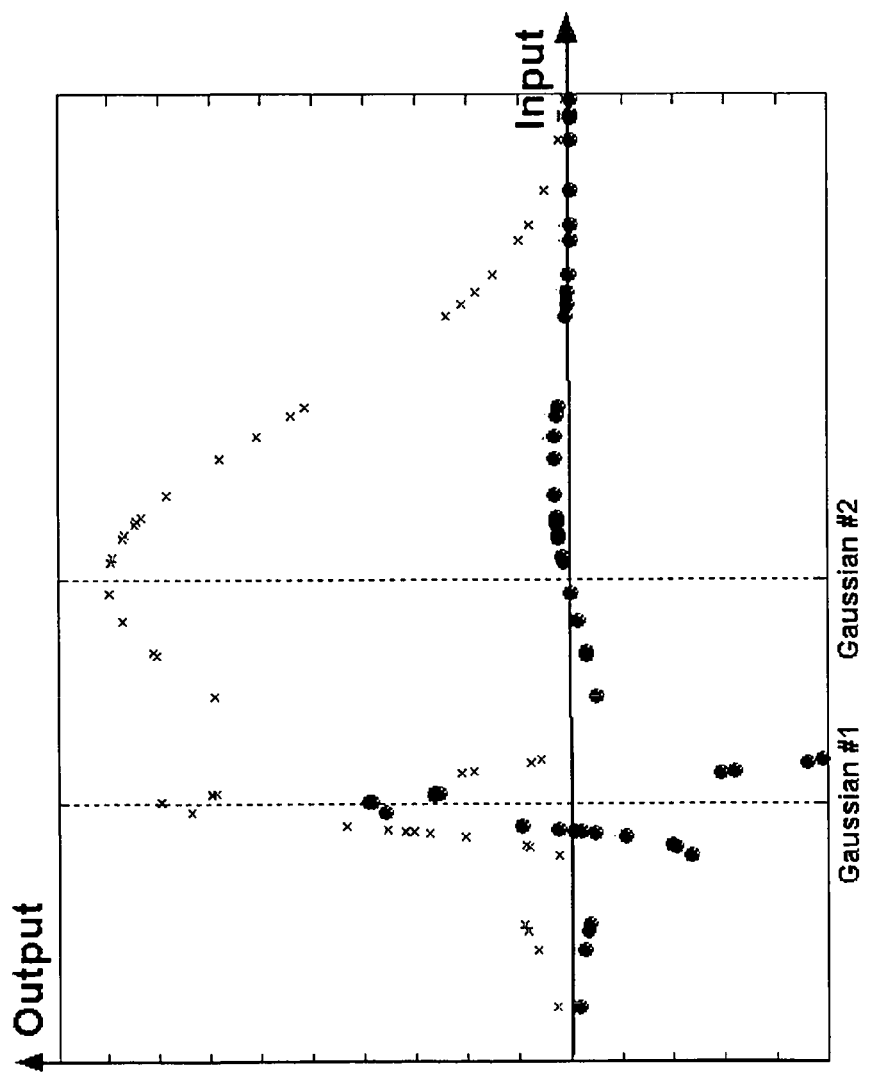
FIG. 9B illustrates the data sets shown in FIG. 9A after one training iteration.

In order to train the RBF neural network, traditional MSE criterion are applied that utilize a variable set of spreads to include the spreads used to formulate the statistical training set shown in FIG. 9A. Accordingly, it would be expected that the model would identify the Gaussian distributions with the minimum MSE identifying the Gaussian No. 2 distribution as the winner in the first iteration. This is logical since Gaussian No. 2 would minimize the overall error. However, a problem occurs after the first iteration when the training dataset is corrected by subtracting the dataset's response to the first Gaussian node of the network. The resulting dataset is shown in FIG. 9B where the solid circles represent a single merged data set. The original data sets are included in FIG. 9B as small x's with the original mean values labeled. An examination of the resulting data set shown in FIG. 9B leads to two points that can be made after the first iteration:

(1) Gaussian #2 is correctly modeled since all of its data points are absorbed providing a close to zero network output; and (2) Gaussian #1 data points have not been absorbed and the distribution of the data points has lost its original form.

The second point above is a constraint that traditional RBFs neural networks can not overcome with the addition of one node to the network. If a bias would be used, the bias would not work because it would have to operate in the whole input space. In order to operate within a specific range, the linearity of the second layer of the network would have to be resolved. But even if a linear bias could be introduced it would not always be able to capture the non-linear output modification indicated in FIG. 9B by the up or down non-linear shifting. So traditional RBFs neural networks have to use a significant number of additional nodes with relatively small widths with a result that it is questionable if a sufficient accuracy can be achieved.

To compensate for the problematic case mentioned above, the present invention contemplates some modifications to the traditional RBF neural network to incorporate local behavior into node evaluation. First, the influence of a local statistic in the node selection process is introduced that is in addition to the traditional MSE. Second, a method to allow multi-scale overlapping receptive fields is included that blocks parts of the input space that are successfully mapped.

Figure 1:
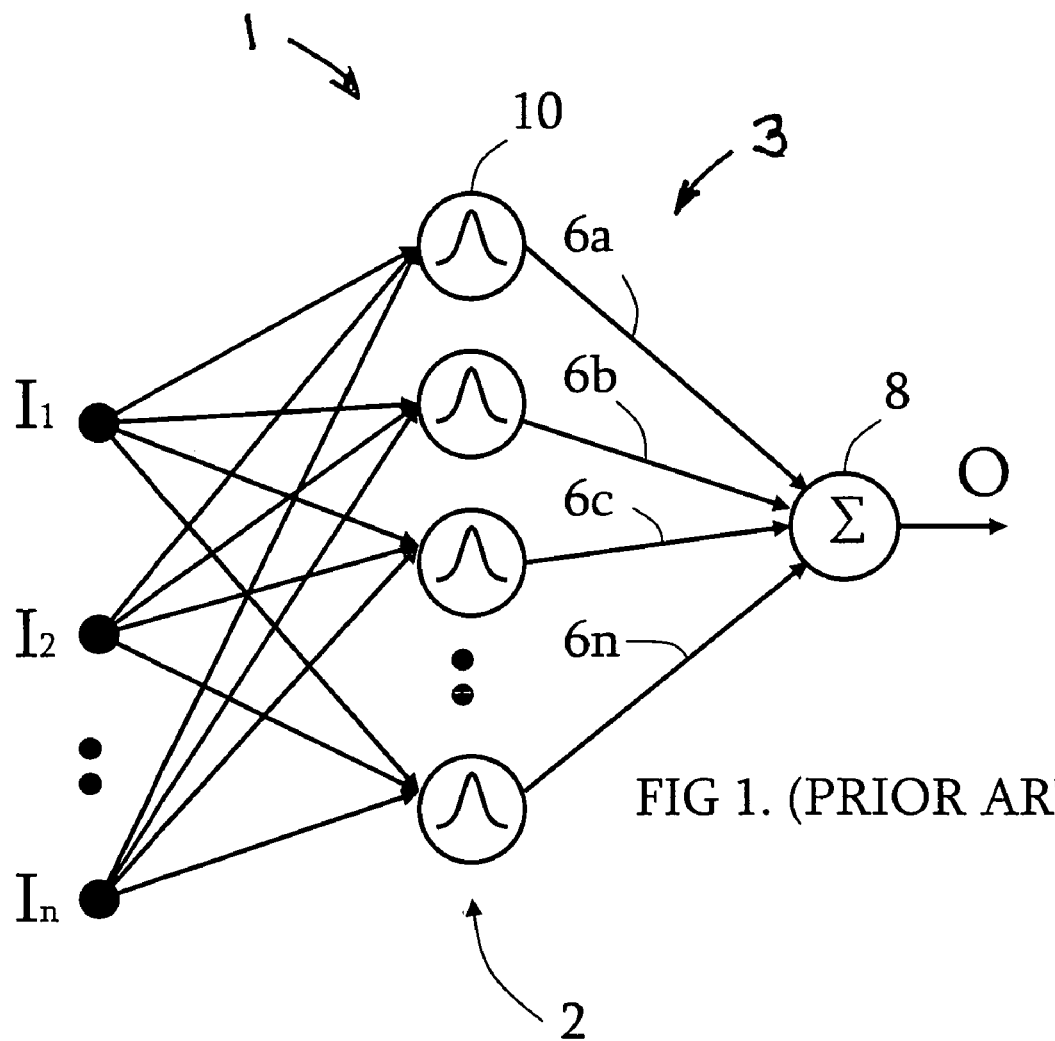
FIG. 1 shows a typical prior art Radial Basis Function (RBF) neural network architecture.
Figure 2A:
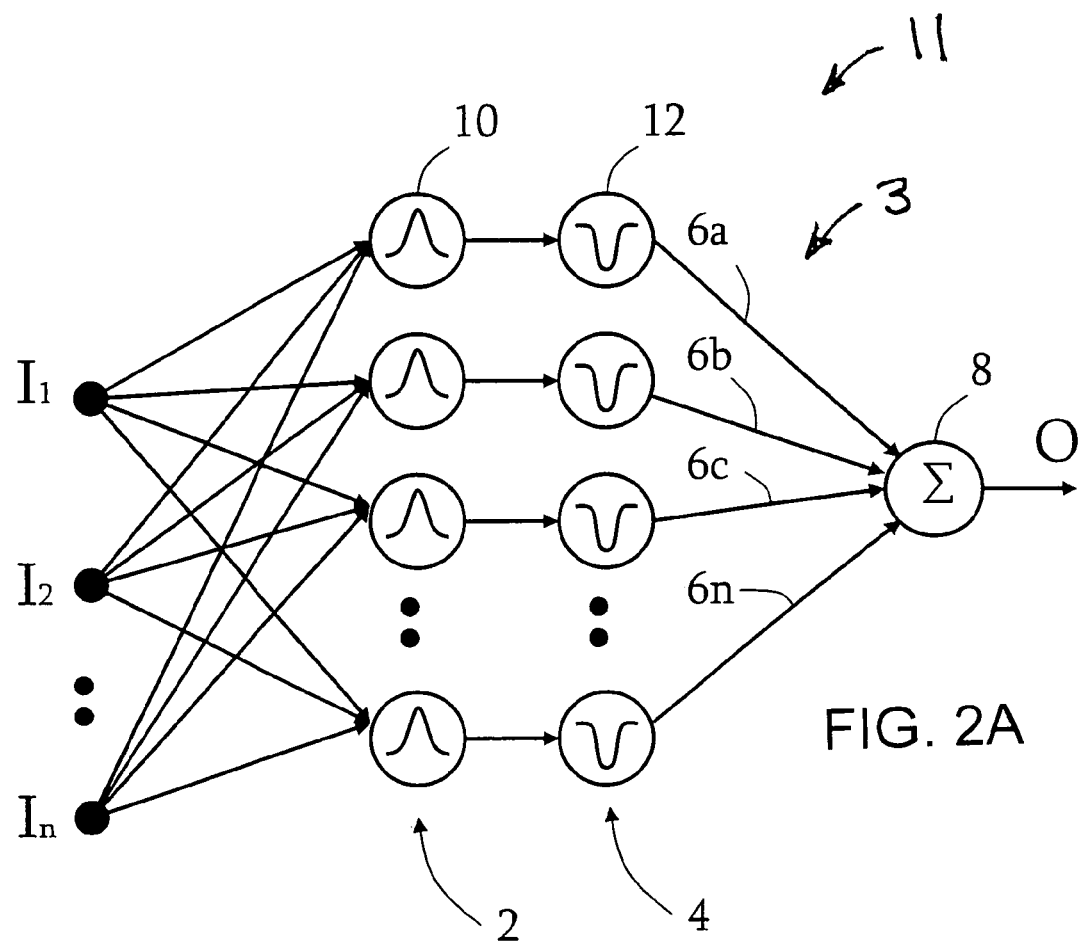
FIG. 2A shows a Multi-scale Radial Basis Function (MSRBF) neural network architecture using a Blocking Layer in accordance with the invention.

As stated above, the underlying idea of the present invention is to create a Multi-Scale Radial Basis Function (MSRBF) neural network that will choose the two Gaussian distributions shown in FIG. 9A over other candidates by examining local behavior in addition to global MSE. Such architecture is illustrated in FIG. 2, where a network architecture of a system 11 in accordance with the present invention that utilizes a Multi-scale Radial Basis Function (MSRBF) neural network. Components shown in FIG. 2A that are similar to components shown in FIG. 1 have the same numerical identifiers. The system 11 includes a plurality of input nodes that are labeled $I_1, I_2 \ldots$ and $I_n$. The input nodes are connected by signal paths to a hidden layer 2 that comprises of a plurality of non-linear activation function nodes 10. The hidden layer 2 also may be referred to as an activation layer. While only one activation layer is shown in FIG. 2A, it will be appreciated that the invention also may be practiced on neural networks having more than one activation layer (not shown). As illustrated by the crossing paths in FIG. 2A, the input of each of the input nodes $I_1$, $I_2$ ... and $I_n$ is connected by multiple signal paths to each of the non-linear function nodes 10. The non-linear activation functions of the nodes 10 are based on the Euclidean distance between an input vector and a weight vector. The non-linear activation functions may include Gaussian functions, Sigmoidal functions, inverted symmetrical Sigmoidal functions and other functions that are utilized in conventional neural networks. The output of each of the non-linear function nodes 10 is connected to a single node in a blocking layer 4. In the preferred embodiment, the blocking layer 4 is comprised of binary nodes; however, it will be appreciated that the invention also may be practiced with a blocking layer comprised of inverted symmetrical Sigmoidal nodes that act in a binary fashion or other functions that act in a similar binary fashion. The blocking layer nodes are labeled by the numerical identifier 12 in FIG. 2A. The output of each of the blocking layer nodes 12 is connected to a linear output layer 3. The linear output layer 3 consist of a plurality of weighting functions that are labeled 6a, 6b, 6c ... 6n, with one of the weighting functions acting on the output of a corresponding one of the blocking layer nodes 12. The responses of the linear output layer 3 are added at the summing point 8 to form an output signal O.

Figure 2B:
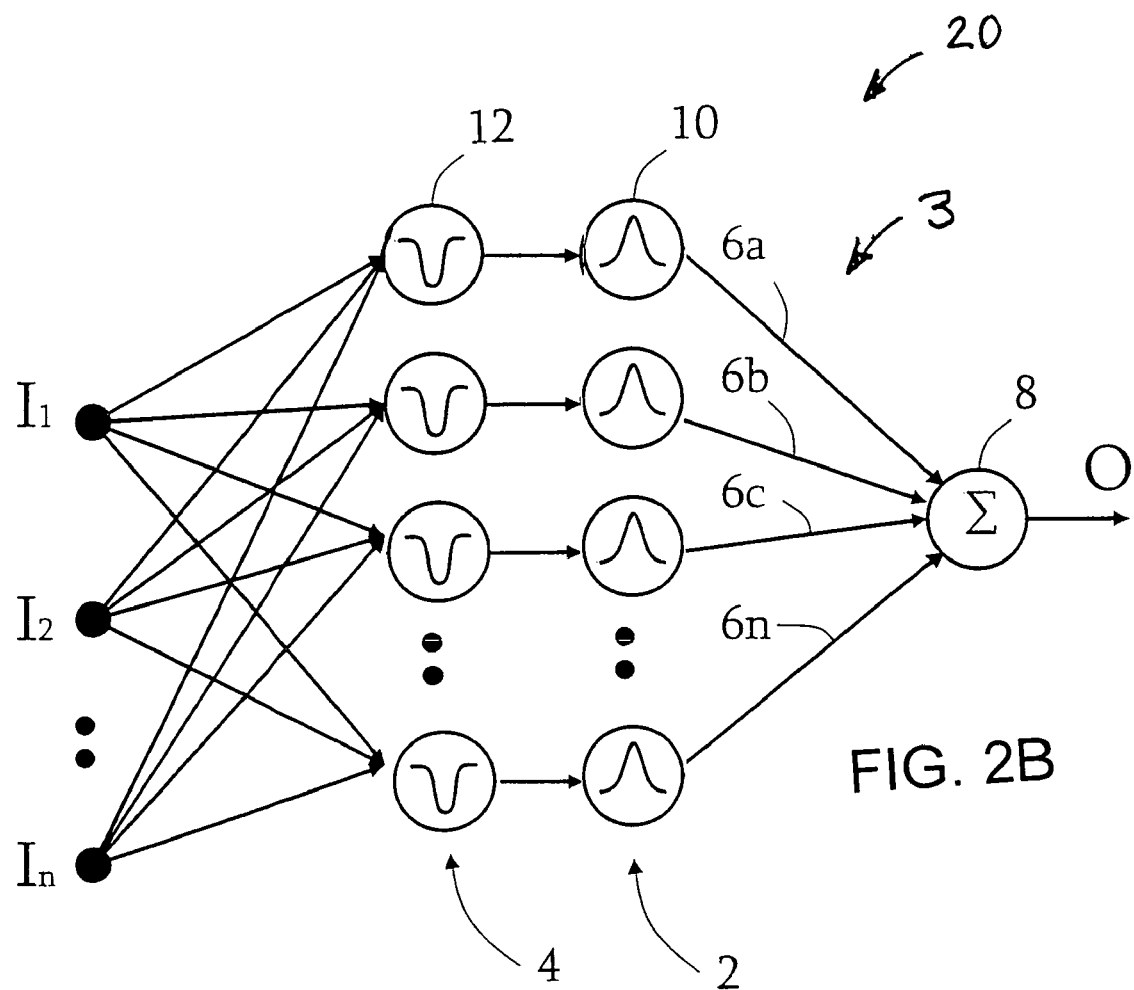
FIG. 2B shows an alternate embodiment of the MSRBF neural network architecture shown in FIG. 2A.
Figure 2C:
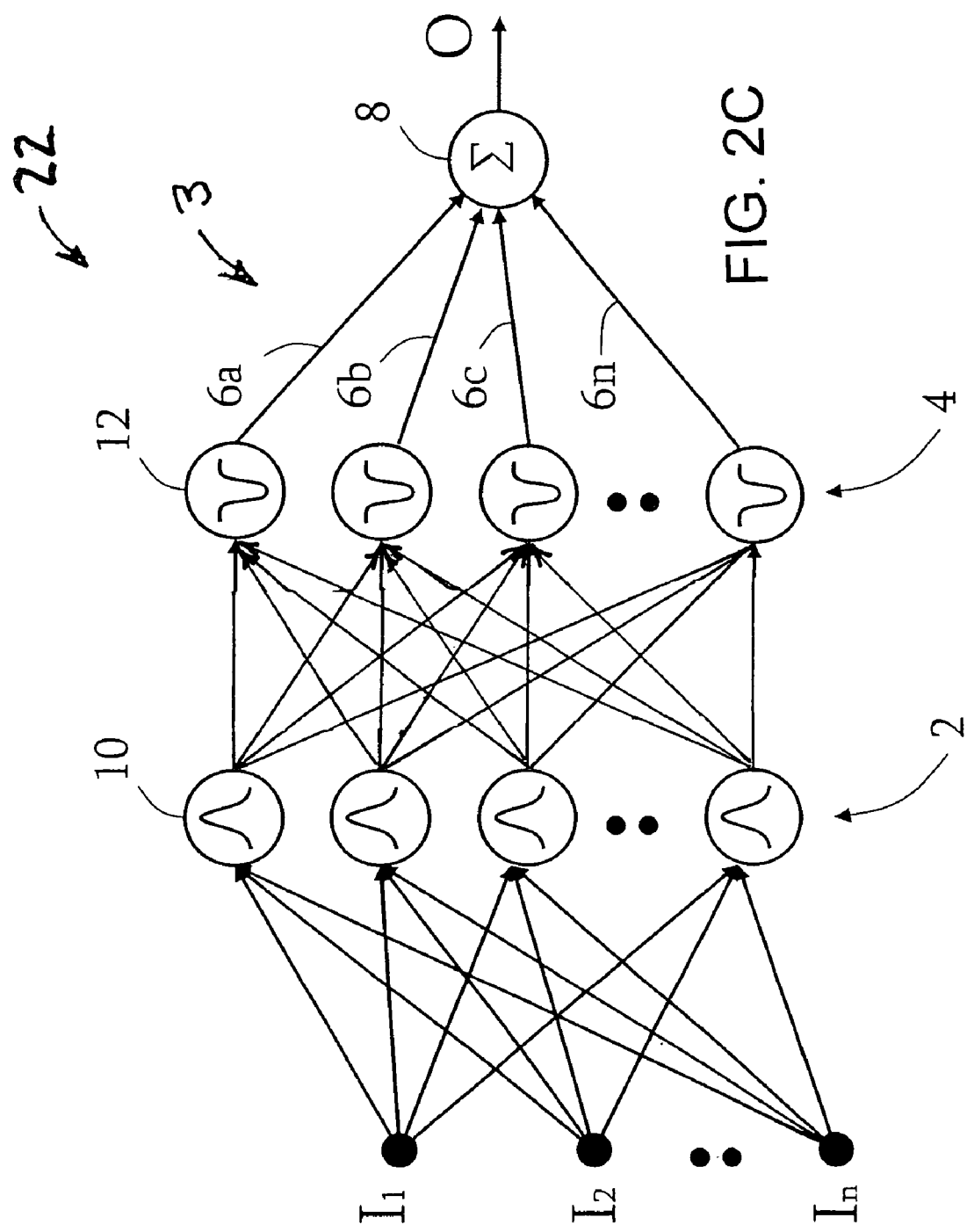
FIG. 2C shows another alternate embodiment of the MSRBF neural network architecture shown in FIG. 2A.

While the preferred embodiment of the invention has been illustrated in FIG. 2A and described above with the hidden layer 2 preceding the blocking layer 4 with respect to the signal flow path, it will be appreciated that the invention also may be practiced with the blocking layer 4 preceding the hidden layer 2 as shown generally at 20 in FIG. 2B. Another alternate embodiment 22 of the invention is illustrated in FIG. 2C where each of the nodes 10 in the hidden layer 2 is connected by a signal path to all of the nodes 12 in the blocking layer 4. In a similar manner, an alternate embodiment 24 of the invention shown in FIG. 2B is shown in FIG. 2D, where each of the nodes 12 in the blocking layer 4 is connected by a signal path to all of the nodes 10 in the hidden layer 2.

Figure 3A:
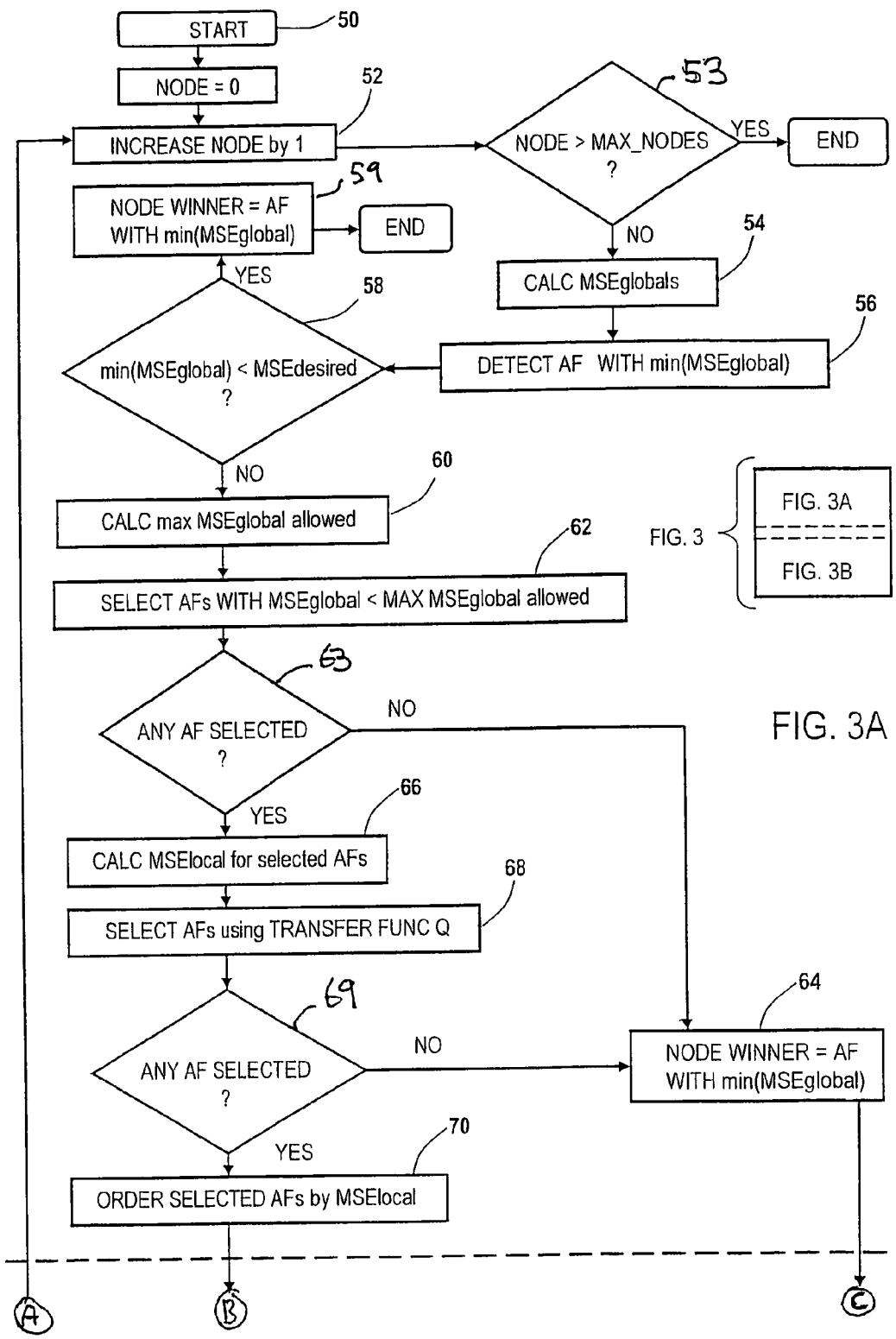
FIG. 3 shows a flow diagram of an algorithm for implementation of the MSRBF neural network shown in FIG. 2.

Referring now to FIG. 3, there is illustrated a flow diagram of a training algorithm in accordance with the invention for implementing the hidden layer 2 and the blocking layer 4 shown in FIG. 2A. The goal of this training algorithm is to:

i) identify the best combination of activation functions (AFs) and assign each one of them to a specific node in the hidden layer 2 of FIG. 2A, and ii) identify, if necessary, blocking functions to add in the blocking layer 4 of FIG. 2A.

The candidate pool of activation functions and blocking functions is based on pre-defined selections/combinations by the user in terms of function family (e.g. Gaussian, Sigmoidal) and some constraints in function specific parameters (e.g. spread value ranges if Gaussian functions are chosen). Parameters not constrained are identified during the training process (e.g. the center of a Gaussian AF, and the shift of a Sigmoidal blocking function).

The algorithm sequence begins at the START block 50, and then flows through according to the logic of the flow diagram. After initializing a node counter NODE to zero, the algorithm follows a basic construct of a sequence that is an iterative loop starting in functional block 52 with a first one of the blocking nodes 12 shown in FIG. 2A and continuing on through a MAX_NODE, a predefined value that corresponds to the last blocking node shown at the bottom of the blocking layer 4 in FIG. 2A, as determined by decision block 53. Thus, upon iterating past the final one of the blocking modes 12, decision block 53 transfers to end and exits the algorithm. Otherwise, the algorithm transfers from decision block 53 to functional block 54 where the algorithm proceeds by calculating a global Mean Square Error (MSEglobal) for every candidate Activation Function (AF). Threfore, when the operation shown for functional block 54 is completed, there exists a plurality of MSEglobals (each corresponding to a specific AF) that are candidates for a specific non-linear node 10. The node counter NODE specifies which node they are candidates for, where for NODE=1 we have the top node 10 in layer 2, for NODE=2, the second top node 10 in layer 2, and so on. The algorithm then continues to functional block 56.

From the plurality of calculated MSEglobals, the AF with the minimum MSEglobal is detected in functional block 56. The algorithm then advances to decision block 58 where the detected minimum MSEglobal is compared to a desired Mean Square Error (MSEdesired) that is provided by the user before running the program as an indicator of achieving sufficient accuracy to halt the algorithm iterations. If the detected minimum MSEglobal is less than MSEdesired, the accuracy goal has been reached and no more iterations are needed. Accordingly, the algorithm transfers from decision block 58 to functional block 59 where the current minimum AF is taken as the node winner. The algorithm then ends.

If, in decision 58 the detected minimum MSEglobal is greater than, or equal to, MSEdesired, the program transfers to functional block 60 and calculates a maximum MSEglobal allowed based on a user predefined variable spread $\sigma_g$ and the iteration number using the following formula:

$$MSE_{global\_max}(iter) = MSE_{Desired} + \left[(MSE_{Starting} - MSE_{Desired}) * \exp\left\{-\frac{iter^2}{2\sigma_g^2}\right\}\right]$$

where iter is the current iteration number, $MSE_{Starting}$ is the $MSE_{global}$ before the iterations and the user predefined variable spread $\sigma_g$ acts as a standard deviation in the modified Gaussian function presented below. The role of the calculated $MSE_{global\_max}$ parameter is to ensure that, if the best $MSE_{global}$ candidate is not chosen, the selected activation function will capture a significant amount of global error. In other words, $MSE_{global\_max}$ expresses the amount of flexibility allowed between the chosen and the minimum value of the $MSE_{global}$. This flexibility decreases as the algorithm progresses through the iterations. The decrease rate is presented through the spread $\sigma_g$ of the above equation. A larger $\sigma_g$ allows potential acceptance of more activation functions with better local than global performance. On the other hand, if the value of $\sigma_g$ is too high there is a risk of not achieving the desired final global accuracy. So there is a trade-off in the definition of $\sigma_g$. A preferred value for $\sigma_g$ is:

$$\sigma_g = \text{maximum\_nodes\_allowed}/(2*3),$$

which allows potential candidates of high local accuracy to be included but only up to half the total number of total iterations (nodes). Then the analysis will only include $MSE_{global}$ criterion to ensure high final accuracy.

The algorithm then continues to functional block 62 where, given the MSEglobal values, AFs with MSEglobal <maximum MSEglobal allowed are selected. Once the AFs are selected, the algorithm advances to decision block 63.

In decision block 63, the algorithm determines whether any of the AFs have been selected in functional block 62. If no AFs were selected in the preceding block 62, the algorithm transfers to functional block 64 where the AF with minimum MSEglobal is selected as the node winner. The algorithm then continues to functional block 77 on FIG. 3B. Otherwise, decision block 63 transfers the algorithm to functional block 66 where MSElocal values are calculated for the selected AFs with the formula shown in the following paragraph.

Since a prerequisite for a RBF activation function is to be localized, the corresponding receptive field within which the function is active can be easily calculated. During each candidate examination with the algorithm, a subset of the dataset is created including only points that fall within this activation field. Accordingly, in functional block 66, a local MSE is calculated, using this subset of points that fall with the activation field according to the formula:

$$MSE_{local} = \frac{\sum_{1}^{k}(y-\hat{y})^2}{k}$$

where $\hat{y}$ is the network response, y is the expected response from the training set and k is the number of points in the subset dataset (k<n) representing the points that fall within the node's receptive field.

The next step in the investigation is to find a method that combines both local and global MSE in an appropriate manner. The selection of a node should be based on minimizing both global and local MSEs. But this minimization usually does not happen for the same activation function. An activation function with smaller spread might fit better the data locally while another one with larger spread/receptive field could provide a better global error reduction. In the following paragraphs the necessary changes in network architecture will be described, as well as optimal selection of a node minimizing both global and local MSEs. Additionally, statistical tests will be presented that verify the superiority of the method of the present invention. The algorithm proceeds to functional block 68.

Figure 7:
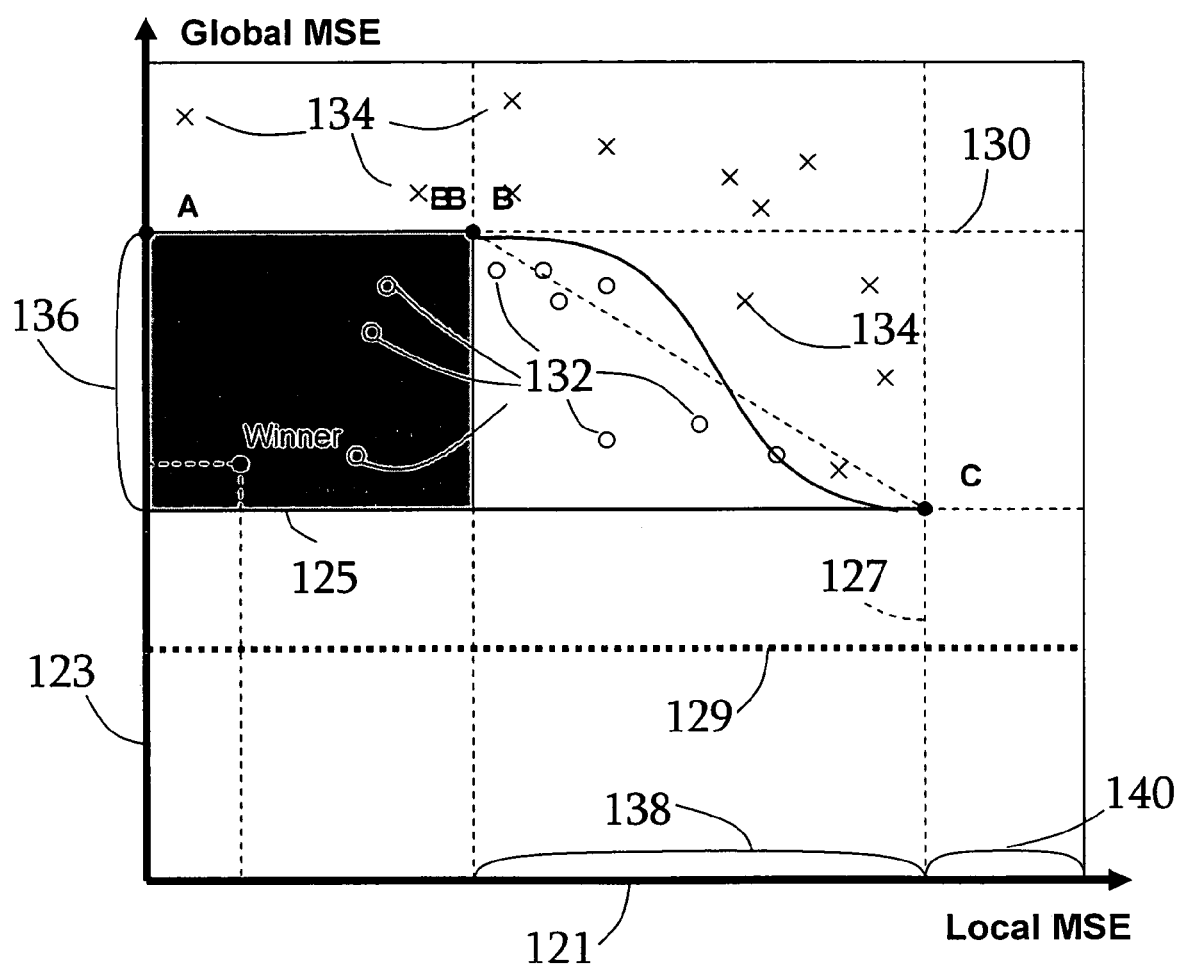
FIG. 7 is useful for a further understanding of a portion of MSRBF neural network shown in FIG. 2.

Functional block 68 represents the core of the algorithm. It describes the process with which an AF is chosen that has both low $MSE_{global}$ and $MSE_{local}$. The process is discussed in detail in this paragraph and in the following paragraphs and relies on creating a membership function to choose all possible candidates. The functional selection of an AF is illustrated in FIG. 7. The X axis 121 is the local MSE for all the candidate functions and the Y axis 123 represents their global MSE. By mapping functions on the [$MSE_{local}$, $MSE_{global}$] 2D space a ranking process is provided that is based on these two values. There are four parameters that are essential to define the graph shown in FIG. 7. The parameters are:

i. Best global MSE: All the $MSE_{global}$ values are calculated and ranked. The MSE 125 with the minimum value is assigned here.
ii. Local MSE of best global solution 127: This value corresponds to the $MSE_{local}$ for the candidate function that provided the minimum $MSE_{global}$.
iii. Desired MSE 129: This is the cut-off, the threshold value for the $MSE_{global}$. If this value is reached then the iterations stop because the desired accuracy is achieved.

Maximum Global MSE 130: This value expresses the maximum MSEglobal allowed for a specific iteration number.

After the above four parameters are defined points, A, B and C can be represented on the graph. A membership function $Q(MSE_{local})$ is defined that connects these points. This membership function restricts the acceptable solutions by establishing a correlation between local and global MSE. It is given by the equation:

$$Q(MSE_{local}) = \begin{cases} MSE_{global}^{max} & \text{if } MSE_{local} \in [0, MSE_{Desired}] \\ MSE_{global}^{best} + \\ [(MSE_{global}^{max} - MSE_{global}^{best})/ & \text{if } MSE_{local} \in (MSE_{Desired}, \\ \{1+\exp\{-a_q(MSE_{local} - & MSE_{global}^{of\_best\_global}) \\ c_Q)\}\}] \\ 0 & \text{if } MSE_{local} \in [MSE_{local}^{of\_best\_global}, +\infty) \end{cases}$$

where the symbol $\epsilon$ represents "is between the values of".

All the candidate points have a calculated $MSE_{global}$. If their $MSE_{global}$ is smaller than the membership $Q(MSE_{local})$ based on their $MSE_{local}$ value, then these points are accepted. The accepted points are shown with a circle 132 on FIG. 7. Otherwise they are rejected and the rejected points represented with a cross 134 on FIG. 7. If no accepted points are found then the solution with the best $MSE_{global}$ remains. Also, if the $MSE_{local}$ value of the best $MSE_{global}$ is smaller than the $MSE_{Desired}$ then it is automatically accepted without going through this process. From all the accepted points (m) the one with the minimum $MSE_{local}$ value is the winner. Formally: $MSE_{global}^{winner} \epsilon [MSE_{gobal}^{i=1}, \ldots, MSE_{global}^{i=m}]$, where $MSE_{global}^{i=[1\cdots m]}$ satisfies the condition that:

$MSE_{global}^{i=[1\cdots m]} < Q(MSE_{local}^{i=[1\cdots m]})$ and the winner is: $MSE_{local}^{winner} = \min[MSE_{local}^{i=1}, \ldots, MSE_{local}^{i=m}]$.

The reasoning behind each of the three segments of $Q(MSE_{local})$ will now be examined in the following paragraphs respectively. The criteria for a candidate to be accepted is that the global error of the candidate, i.e., the Y axis value, should be smaller than $Q(MSE_{local})$.

The first segment is $MSE_{local} \epsilon [0, MSE_{Desired}]$. In this segment, a linear constant function is chosen. This way any candidates that have local accuracy better than the desired one and global accuracy better than the one allowed based on the iteration number are accepted. Such points are contained with the dark shaded area that is labeled 136 in FIG. 7. This makes sense because any candidate with really good local behavior should be included as long as it contributes acceptably in the global error minimization.

The second segment is $MSE_{local} \epsilon (MSE_{Desired}, MSE_{local}^{of\_best\_global})$. For this segment a transition function from point B to C is utilized. This function expresses the rate at which we are willing to sacrifice global accuracy for a better local solution. The magnitude is defined by the maximum $MSE_{global}$ allowed as calculated earlier. The last constant together with the $MSE_{Desired}$ provide a scaling on the global MSE axis. In the X axis, the local MSE one, scaling is adjusted based on the $MSE_{local}$ value of the best $MSE_{global}$ solution and the $MSE_{Desired}$ value. In this example we chose a Sigmoidal transition function. Constants aQ and cQ are predefined. Constant aQ expresses the slope of change while constant cQ makes sure that the Sigmoidal response in the middle of the segment is half between points B and C. The range of the selected points can be seen in FIG. 7 in area 138 which contains only points with smaller $MSE_{global}$ than the sigmoidal, or linear, function. Alternatively a different transition function can be used if another rate of change is preferred, such as, for example, a linear rate of change.

The third segment is $MSE_{local} \in [MSE_{local}^{of\_best\_global}, +\infty)$. This value is set to zero because any candidates that have a worse $MSE_{local}$ than the one of the initially chosen candidate with the best $MSE_{global}$ are not to be accepted.

The algorithm then advances to decision block 69. If none of the AFs satisfy the MSE local/global transfer function $Q(MSE_{local})$, then decision block 69 transfers the algorithm to functional block 64 where, as described above, the node with the minimum MSEglobal is taken as the node winner. The algorithm then continues to functional block 77 on FIG. 3B. If one or more AFs were selected in functional block 68, decision block 69 transfers the algorithm to functional block 70 where multiple AFs are ordered by their MSElocal values with the AFs that are less than MSElocal placed first in the order. Basically, decision block 69 provides a check to determine if there are any points marked as circles in FIG. 7 present. The algorithm then continues to functional block 71 in FIG. 3B where it is determined whether a local density check is needed. The criteria utilized for the density check in functional block 71 are left for the user to pre-define before initiation of the algorithm. One example of such a density check criteria would be a constraint that at least two or more training pints should fall within the node's receptive field.

Figure 3B:
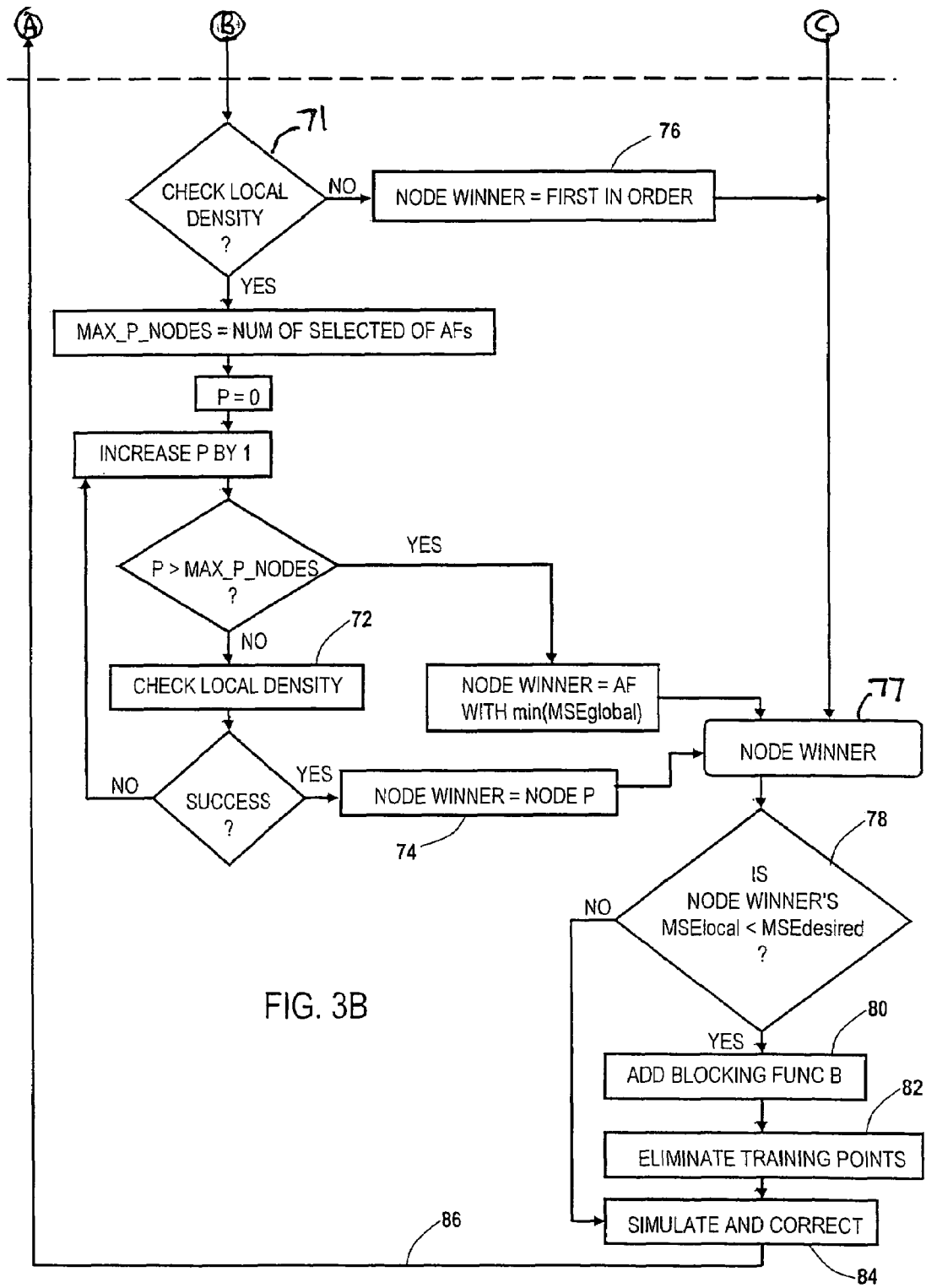

If a local density checked is to be performed, decision block 71 causes the algorithm to loop through the previously ordered list of AF in the blocks shown immediately below decision block 71 in FIG. 3B. While in the loop, the algorithm checks for local density in functional block 72. The first AF that passes local density check is selected as the node winner in functional block 74. Otherwise, decision block 71 transfers the algorithm to functional block 76 where the node winner is the first in order based on MSElocal values.

The node winner AF, which is shown selected in functional block 77, is further checked in decision block 78 for whether the local characteristic of this AF is less than the desired MSE, i.e., MSElocal <MSEdesired If the node winner AF is less than the desired MSE, then the algorithm transfers to functional block 80 where a corresponding blocking function $B_j$ ($MSE_{local}$) is added. The algorithm continues to functional block 82 where the training points within the winner's receptive field from the training set are eliminated. The training set is then simulated with the winning AF, and the output vector y for the next NODE iteration is corrected in functional block 84.

Returning to decision block 78, if it is determined that MSElocal≧MSEdesired, the algorithm transfers directly from decision block 78 to functional block 84. At this point the program returns along the line labeled 86 to the beginning of the iterative loop at functional block 52, where the node is increased by one and the algorithm continues as described above.

The following paragraphs describe statistical tests that verify the superiority of the approach utilized in the present invention when compared to prior art methods.

Figure 4:
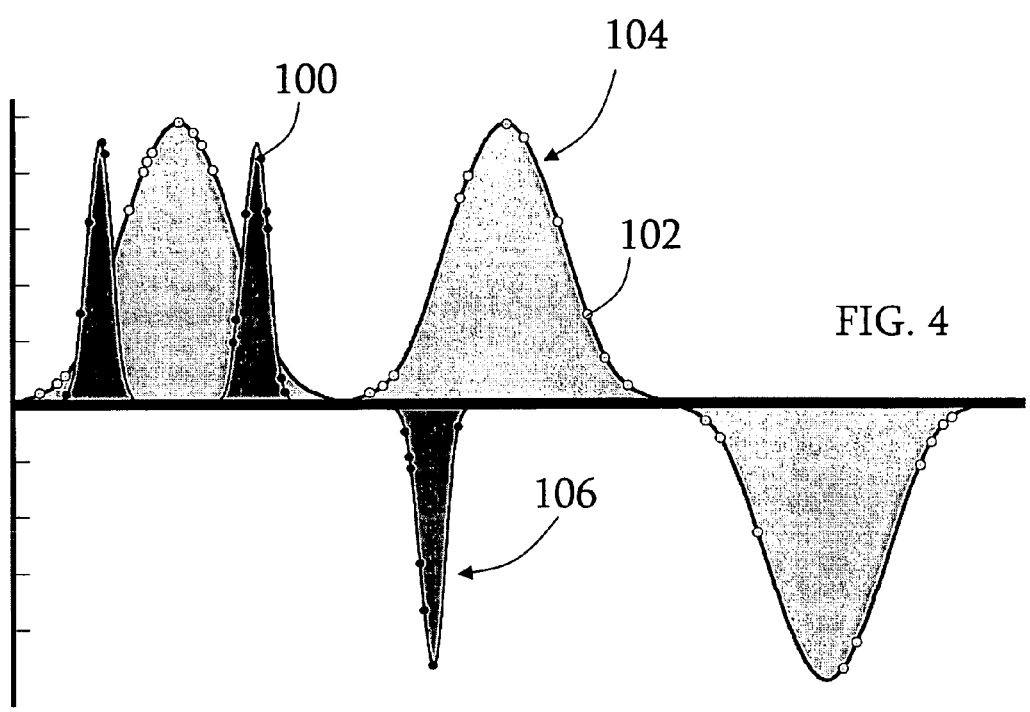
FIG. 4 shows an example of a training set used in the algorithm shown in FIG. 3.

Referring now to FIG. 4, there is illustrated an example of a training set that was used in a statistical analysis of the MSRBF, in accordance with the present invention, as compared to two other currently used solutions, namely, prior art Radial Basis Function (RBF), and a Variable Spread Radial Basis Function (VRBF). The VBRF represents an RBF where Gaussian activation functions with multiple spreads are tested simultaneously. The training set is comprised of the dark 100 and lighter 102 shaded points along the curves of the local 106, and global 104 Gaussians, respectively. The curves 104 and 106 show the underlying statistical function used to randomly generate the testing dataset with all of the points in the graph being used. The solid circle points 100 show points on curve 106 generated by local Gaussians having a small spread, while the open circle points 102 shows points on curve 104 generated by global Gaussians having a large spread.

Figure 5:
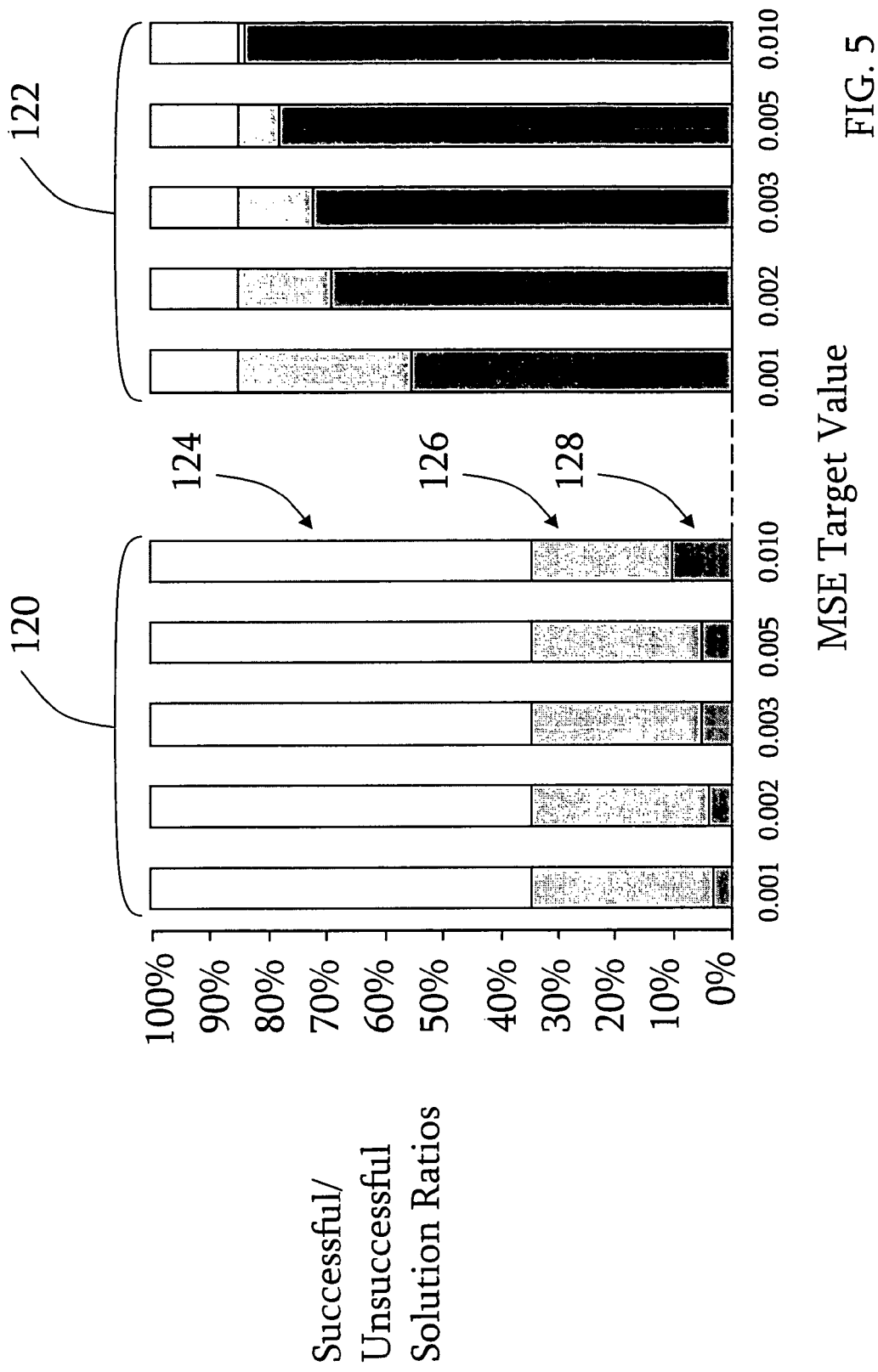
FIG. 5 shows a bar graph of consistency of convergence of the networks and how it propagated from training to testing for the MSRBF neural network shown in FIG. 2A and the prior art RBF neural network shown in FIG. 1.

Referring now to FIG. 5, there is illustrated a bar graph showing ratios between successful solutions and unsuccessful solutions, where success is measured in terms of having the MSE being less than a specific value. The leftmost five bars 120 correspond to a prior art RBF solution and the five rightmost ones 122 to a MSRBF that is in accordance with the present invention. Each bar at the graph has three percentages that sum up to 100%. The clear shaded regions 124 of the bars show the percentage of unsuccessful solutions in training, in essence all the times that the network did not converge to the desired MSE during training. The light 126 and dark 128 gray regions correspond to the times the network did converge during training. The dark gray regions 128 show that, not only training was below a selected MSE threshold goal of 0.001 for acceptable error, but the testing also was below the threshold, or a multiplier of the threshold, as well. Light gray regions 126 correspond to successful training, but unsuccessful testing. Going from left to right in FIG. 5, each group of five bars show different convergence rates for a successful solution in training and testing based on different testing MSE goal values. These five MSE goal values were based on {1, 2, 3, 5 and 10} times the original MSE target value for acceptable error, i.e. {0.001, 0.002, 0.003, 0.005, 0.010} as shown below the horizontal axis. The results show that a successful solution in training and testing for the RBF was achieved 3-5% of the time with the testing MSE goal ranging from 0.001 to 0.01. For the MSRBF, a successful solution in training and testing was achieved 56% of the time for MSE testing=0.001, climbing fast to 70% for MSE testing=0.002, and finishing at 85% for MSE testing=0.01. This shows that, even when strict convergence was not achieved, the MSRBF was close to the desired MSE, while the RBF was never in that range. It is noted that the VRBF network type converged to a successful solution in training and testing only 3% of the time so the results were not included in FIG. 5 where only the results obtained from RBF and MSRBF networks are illustrated.

Figure 6:
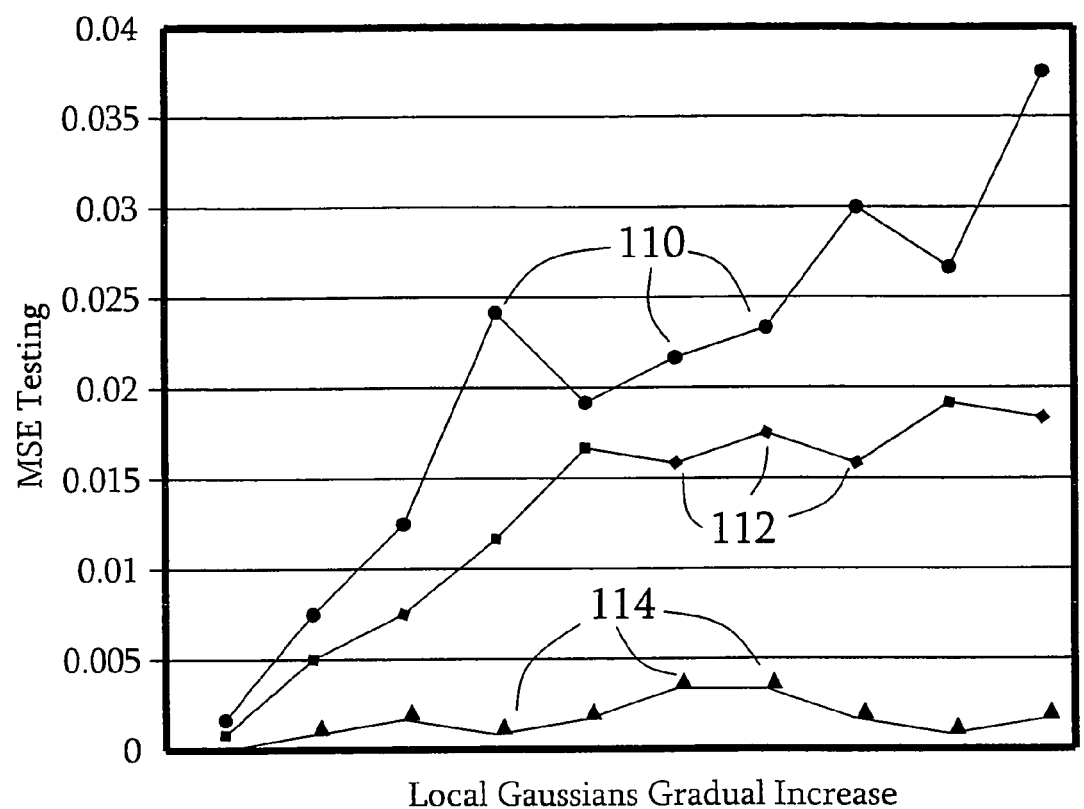
FIG. 6 shows further testing results obtained with the MSRBF neural network shown in FIG. 2 as compared to results obtained with prior art RFB and VRBF neural networks.

Referring now to FIG. 6, there is shown a line graph that illustrates the effect of noise on the achieved testing MSE. Noise is expressed in the dataset in the form of local Gaussians that overlap the global ones. The effect on MSE can be seen as the number of local Gaussians increases from left to right on the graph. The line represented by squares labeled 110 is of an RBF system, while the rhombuses labeled 112 represent a VRBF system, and the triangles labeled 114 represent a MSRBF system. The MSRBF system exhibited a small additional error as noise increased. In contrast to that, the RBF and VRBF systems were significantly influenced by the introduction of noise. The MSRBF system outperformed the both the RBF and VRBF systems, even when minimal noise, i.e., a low number of local Gaussians, were present.

It should now be readily apparent that a novel multi-scale radial basis function neural network capable of achieving the stated objects of the invention has been provided. As can be seen from the network architecture in FIG. 2, the multi-scale radial basis function neural network excludes successfully mapped neighborhoods from later node influence. FIG. 3 shows the technique for identifying the successfully mapped neighborhoods. As shown in FIG. 4, the invention allows variable spread Gaussian functions. The invention is expected to find application in extraction of information from data bases with significantly increased accuracy. For example, the invention is expected to be a very useful tool for analyzing stock market data. Other potential applications include classification and regression problems such as weather analysis, environmental modeling, decision support systems and other civilian and military applications.

Figure 8:
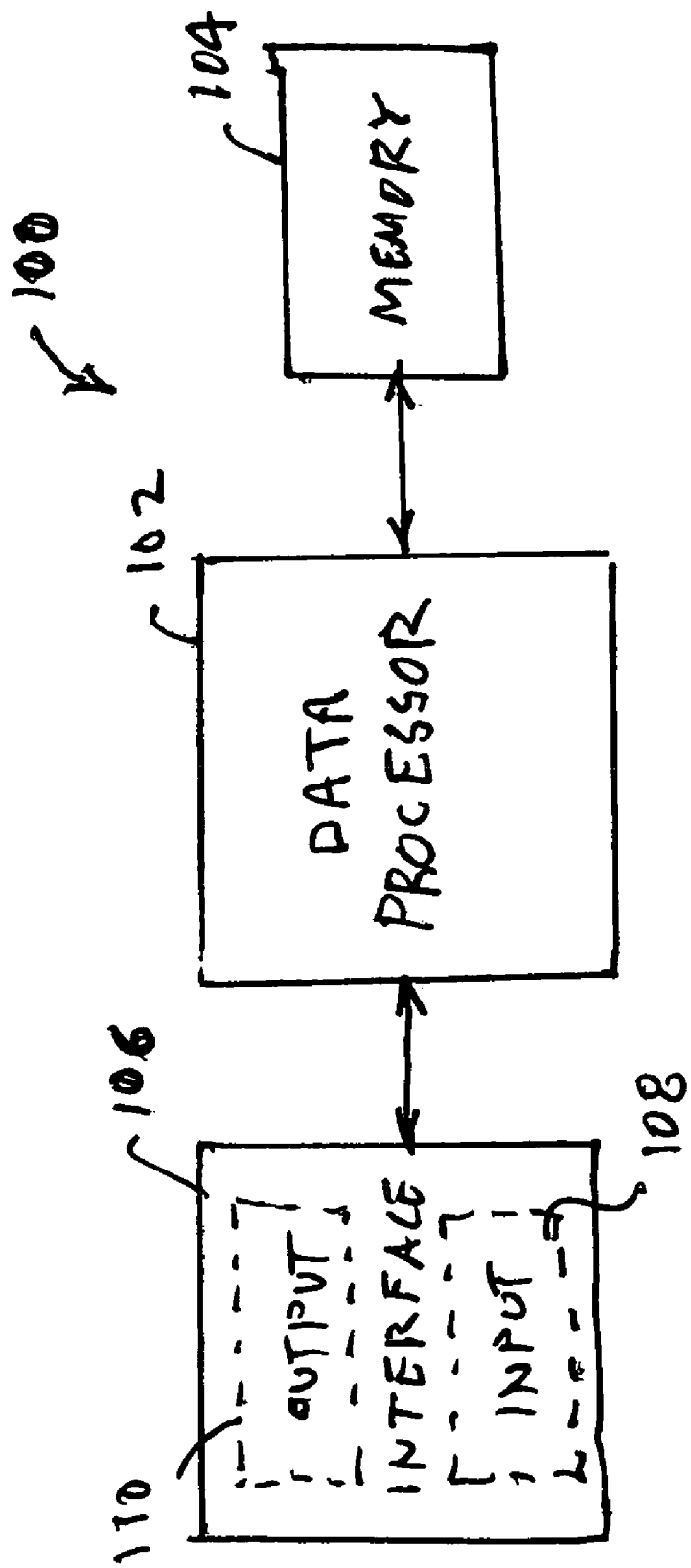
FIG. 8 is a schematic diagram of a data manipulation system that utilizes the present invention.

The present invention also contemplates a data manipulation device 100. A schematic diagram of the device 100 is shown in FIG. 8. The device 100 includes a data processor 102 connected to a memory storage device 104 for storing the data manipulation algorithm described above. While the memory storage device 104 is shown as a separate component in FIG. 8, it will be appreciated that the storage device 104 also may be integrated with the data processor 102. The data processor 102 provides computational capability and may be, for example, a personal computer, a microprocessor that is programmed to perform the data manipulation algorithm, an Application Specific Integrated Circuit (ASIC) or some similar device. The data manipulation device 100 further includes a user interface 106 that includes an input device 108 and an output device 110. The input and output devices 108 and 110 may be free standing components, such as a keyboard for inputting data and a display screen for outputting data. Alternately, the input and output devices 108 and 110 may be combined into a single interface that is connected to the processor 102 or they may be integrated into the processor 102 itself.

The invention also contemplates that the memory storage device 104 includes a first program code segment which defines a signal input and a second program code segment which defines a signal output. The memory storage device also includes a third program code segment which defines a non-linear activation layer comprising a plurality of activation functions coupled between the signal input and the signal output. The memory storage device 104 further includes a fourth program code segment which defines a blocking layer comprising a plurality of selectively active blocking functions coupled between the signal input and the signal output. Finally, the memory storage device 104 includes a fifth program code segment which defines a summer to supply signals to the signal output.

Regarding the fourth program code segment, the invention further contemplates that the fourth program code segment includes a first block of code which is configured to obtain a global Mean Square Error (MSE) for each activation function. The fourth segment also includes a second block of code which is configured to examine whether the lowest global MSE is less than a pre-defined desired MSE. The fourth segment further includes a third block of code which, if the lowest global MSE is not less than the pre-determined desired MSE, obtains subsets of a global dataset including points that fall within respective activation fields of the activation functions. A fourth block of code which calculates a local MSE for each such subset and a fifth block of code which identifies one of the activation functions having a best combination of a minimum local MSE and a minimum global MSE and also included in the fourth segment. Finally, a sixth block of code which blocks the non-linear signal processed signals corresponding to the identified one of the activation functions is included in the fourth segment.

Finally, the invention contemplates a method for training a neural network that includes providing a neural network having at least one activation layer, the activation layer having a plurality of nodes, and also providing a plurality of activation function candidates for each of the nodes in the activation layer. The method further provides a plurality of training data points for the network in order to identify an optimal activation function for each of the nodes in the activation layer. Finally, the activation layer is trained by selecting an activation function for each of the nodes in the activation layer by combining local statistics with global statistics during the node selection process.

The invention further contemplates that the local statistics utilized in training the activation layer are preformed using only training points that fall within the active receptive field of a candidate activation function while the global statistics use training points that fall both within and outside the active receptive field of a candidate activation function. Alternately, the local statistics utilized in training the activation layer are preformed using only training points that fall within the active receptive field of a candidate activation function while the global statistics use training points that fall only outside the active receptive field of a candidate activation function. As another alternative, the local statistics utilized in training the activation layer are preformed using only training points that fall within the active receptive field of a candidate activation function while the global statistics use the whole training data set.

It should further be apparent to those skilled in the art that various changes in form and details of the invention as shown and described may be made. It is intended that such changes be included within the spirit and scope of the claims appended hereto.

What is claimed is:

1. A radial basis function neural network system, which comprises:
   at least one signal input node adapted to receive environmental input data from an environmental data base;
   a non-linear activation layer comprising a plurality of activation functions, said activation layer having an input coupled to said signal input node and an output, each of said activation functions being selected from combinations of a global Mean Square Error (MSE) for all data points within said data base and a local MSE for a subset of data points within said data base, said activation functions being operable to modify said input data;
   a blocking layer comprising a plurality of selectively active blocking functions, said blocking layer having an input coupled to said output of said non-linear activation layer and an output, said blocking layer selectively operative to block selected modified input data and to selectively transmit other modified input data;
   a summer coupled to said output of said blocking layer, said summer operative to combine said transmitted modified environmental input data; and
   a signal output node coupled to said summer and operable to output said combined transmitted modified input data.

2. The radial basis function neural network system of claim 1 wherein each of the outputs of said blocking layer is weighted before being summed.

3. The radial basis function neural network system of claim 2 wherein each of said activation functions is coupled to a corresponding one of the blocking functions.

4. The radial basis function neural network system of claim 3 wherein said blocking functions are binary functions.

5. The radial basis function neural network system of claim 3 wherein said blocking functions are inverted symmetrical Sigmoidal functions.

6. The radial basis function neural network system of claim 4 wherein said activation functions in the activation layer are Gaussian functions.

7. The radial basis function neural network system of claim 5 wherein said activation functions in the activation layer are Gaussian functions.

8. The radial basis function neural network system of claim 1 wherein the selective activation of said blocking functions is performed by a subsystem, which comprises:
 first elements for obtaining a global MSE for each activation function;
 second elements for examining whether the lowest global MSE is less than a pre-defined desired MSE;
 third elements for concluding the process if the lowest global MSE is less than the pre-defined desired MSE;
 fourth elements for, if the lowest global MSE is not less than the pre-defined desired MSE, obtaining subsets of a global dataset including points that fall within respective activation fields of the activation functions;
 fifth elements for calculating a local MSE for each such subset;
 sixth elements for identifying one of the activation functions having a best combination of a local MSE and a global MSE; and
 seventh elements for evaluating if the identified activation function has a local MSE that is less than the pre-defined desired MSE and, if so, blocking the non-linear signal processed signals of subsequently selected activation functions.

9. A device for manipulating data obtained from a data base comprising:
 a data processing device having an input for receiving environmental input data from an environmental data base and an output for outputting manipulated environmental data; and
 a memory storage device connected to said data processing device having stored therein a computer program for providing a radial basis function neural network, said computer program comprising:
 a first program code segment which defines a signal input that is related to said environmental input data;
 a second program code segment which defines a signal output that is related to said manipulated environmental data;
 a third program code segment which defines a non-linear activation layer comprising a plurality of activation functions coupled between the signal input and the signal output, said activation functions being functions of both a global Mean Square Error (MSE) for said data base and a local MSE that is related to each of said activation functions, said activation functions operable to modify said environmental input data;
 a fourth program code segment which defines a blocking layer comprising a plurality of selectively active blocking functions coupled between the signal input and the signal output; and
 a fifth program code segment which defines a summer to supply signals related to said modified environmental data to the signal output.

10. The device of claim 9 further including an interface connected to said data processing device for transferring data from the data base to said data processing device input and for transferring data from said modified data processing device output.

11. The device of claim 10 wherein said memory storage device is a computer readable storage medium.

12. The device of claim 11 in which said third and fourth program code segments define the non-linear activation layer and the blocking layer so that the non-linear activation layer is coupled between the signal input and the blocking layer, with each of the activation functions being coupled to corresponding ones of the blocking functions and the fifth program segment defines the summer to supply signals from the blocking layer to the signal output.

13. The device of claim 12 wherein the blocking functions are binary functions.

14. The device of claim 12 wherein the blocking functions are inverted symmetrical Sigmoidal functions.

15. The device of claim 12 wherein the activation functions in the non-linear activation layer are Gaussian functions.

16. The device of claim 12 wherein the activation functions in the non-linear activation layer are Sigmoidal functions.

17. The device of claim 11 wherein said fourth program code segment includes a code portion to select whether certain blocking functions should be active, the code portion comprising:
 a first block of code which is configured to obtain a global MSE for each activation function;
 a second block of code which is configured to select a lowest global MSE and to examine whether the lowest global MSE is less than a pre-defined desired MSE;
 a third block of code which, if the lowest global MSE is not less than the pre-determined desired MSE, obtains subsets of a global dataset including points that fall within respective activation fields of the activation functions;
 a fourth block of code which calculates a local MSE for each such subset; and
 a fifth block of code which identifies one of the activation functions having a best combination of a local MSE and a global MSE; and
 a sixth block of code for evaluating whether the identified activation function has a local MSE that is less than the pre-determined desired MSE and, if so, blocking non-linear signal processed signals of the subsequently selected activation functions.

18. A device adapted to provide a method for manipulating environmental data comprising:
 a memory storage device for a computer; and
 an algorithm for carrying out radial basis function neural network signal processing stored upon said memory storage device, the algorithm including the steps of:
 (a) receiving input environmental data signals to be processed;
 (b) carrying out non-linear signal processing of the input signals with a processing function to provide non-linear signal processed signals;
 (c) mapping the non-linear signal processed signals;
 (d) selectively blocking the non-linear signal processed signals to exclude successfully mapped ones of the non-linear signal processed signals when a local Mean Square Error (MSE) associated with a subsequently selected processing function is less than a threshold and to provide non-blocked signals when the local MSE associated with the subsequently selected processing function is greater than or equal to the threshold;
 (e) summing the non-blocked signals to give a summed output environmental data signal; and
 (f) outputting the summed signal.

19. The algorithm of claim 18 wherein the selective blocking in step (d) is performed by a binary function.

20. The algorithm of claim 18 wherein the non-linear signal processing in step (b) is performed by a Gaussian function.

21. The algorithm of claim 18 wherein the non-linear signal processing in step (b) is performed by a Sigmoidal function.

22. The algorithm of claim 18 wherein the selective blocking in step (d) is performed by an inverted symmetrical Sigmoidal function.

23. The algorithm of claim 18 wherein the selective blocking in step (d) is performed by the steps of:
   (d1) obtaining a global MSE for each activation function;
   (d2) examining whether the lowest global MSE is less than a pre-defined desired MSE;
   (d3) concluding the process if the lowest global MSE is less than the pre-defined desired MSE;
   (d4) if the lowest global MSE is not less than the pre-determined desired MSE, obtaining subsets of a global dataset including points that fall within respective activation fields of the activation functions;
   (d5) calculating a local MSE for each such subset;
   (d6) identifying a subsequently selected activation function having a best combination of a local MSE and a global MSE;
   (d7) comparing the MSE associated with the subsequently selected activation function to the pre-defined desired MSE; and
   (d8) blocking the non-linear signal processed signals corresponding to the identified one of the activation functions when the MSE associated with the subsequently selected activation function is less than the pre-defined desired MSE and to providing non-blocked signals when the local MSE associated with the subsequently selected activation function is greater than or equal to the pre-defined desired MSE.

24. A radial basis function neural network system, which comprises:
   at least one signal input node adapted to receive environmental input data from an environmental data base;
   a signal output node;
   a summer coupled to said signal output node;
   a blocking layer comprising a plurality of selectively active blocking functions coupled to said signal input node, said blocking layer selectively operative to block selected environmental input data while transmitting other environmental input data; and
   a non-linear activation layer comprising a plurality of activation functions, each of said activation functions being selected from combinations of a global Mean Square Error (MSE) for all data points within said data base and a local MSE for a subset of data points within said data base, said non-linear activation layer being coupled between said blocking layer and said summer, said activation functions being operable to modify said environmental input data and to transmit said modified environmental data through said summer to said output node where the summed modified environmental data is available for use.

* * * * *

UNITED STATES PATENT AND TRADEMARK OFFICE
CERTIFICATE OF CORRECTION

PATENT NO.       : 7,577,626 B1                             Page 1 of 1
APPLICATION NO.  : 11/441954
DATED            : August 18, 2009
INVENTOR(S)      : Georgios Mountrakis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 473 days.

Signed and Sealed this

Seventh Day of September, 2010

David J. Kappos
*Director of the United States Patent and Trademark Office*